Figure 1:
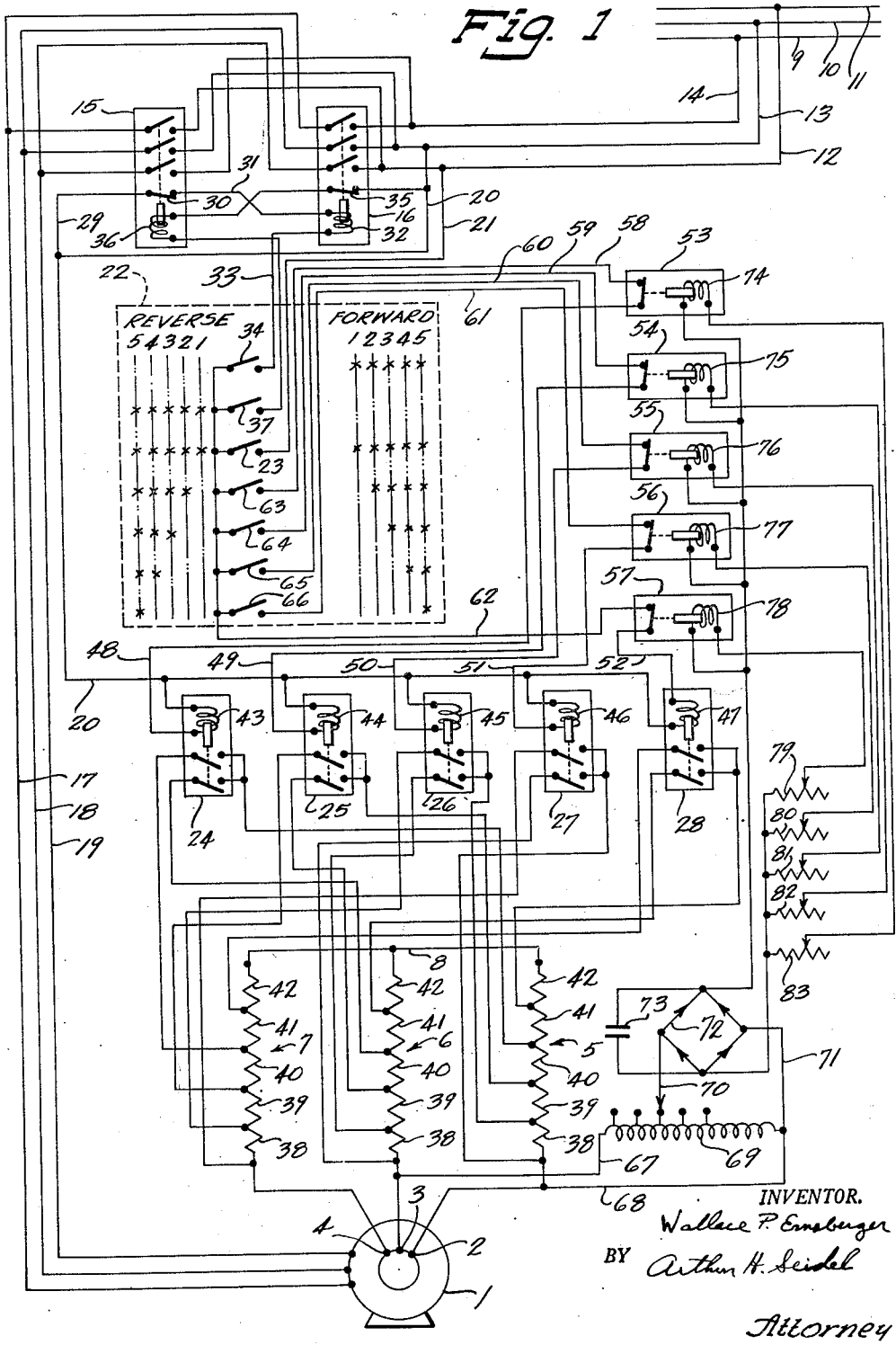

April 6, 1954  W. P. ERNSBERGER  2,674,709
VOLTAGE RESPONSE ACCELERATING AND PLUGGING CONTROL
Filed Nov. 24, 1950  2 Sheets-Sheet 1

INVENTOR.
Wallace P. Ernsberger
BY Arthur H. Seidel
Attorney

Patented Apr. 6, 1954

2,674,709

UNITED STATES PATENT OFFICE 2,674,709

VOLTAGE RESPONSE ACCELERATING AND PLUGGING CONTROL

Wallace P. Ernsberger, St. Louis, Mo., assignor to Harnischfeger Corporation, Milwaukee, Wis., a corporation of Wisconsin Application November 24, 1950, Serial No. 197,406

5 Claims. (Cl. 318—201)

This invention relates to induction motor acceleration and speed control systems and more specifically resides in a system of control that regulates insertion and removal of external resistance associated with a wound secondary through the operation of a plurality of switch means responsively dependent upon values of the secondary voltage whereby speed, acceleration, and plugging characteristics of the motor may be governed.

Suitable control for speed, acceleration and plugging of an induction type motor may be had by using the well known method of varying the resistance value in the secondary circuit. Both manual and automatic means have heretofore been employed to gain this end.

Under a constant load condition the difference between synchronous speed and rotor speed of an induction motor is just a sufficient amount to induce enough current in the secondary to provide a torque to overcome the load and rotational losses. Thus, when the torque required to sustain the load is constant a variation in motor speed may be had by a variation of the secondary resistance which effects a change in the rotational loss of the motor. Variation of secondary resistance is likewise important for control of acceleration and plugging. Current inrushes may be limited by insertion of resistance in the secondary upon the occurrence of large slip during starting and plugging. Also, for purposes of acceleration the slip at which the maximum torque may be obtained may be altered by varying the value of secondary resistance, an increase in secondary resistance providing the maximum torque at a greater value of slip.

Voltage, current and frequency of the secondary circuit vary with rotational speed. A locked rotor secondary, acting similarly to a transformer secondary, will have line frequency and large values of current and voltage induced therein. As acceleration of the rotor takes place the rate of cutting flux in the secondary decreases and frequency, current and voltage will diminish in proportional relation to the rotational speed. An automatic control means responsive to one of these circuit characteristics may therefore provide an index for insertion and removal of resistance in the secondary at optimum intervals and, as already noted, various systems have heretofore been operated in this manner.

Automatic control systems that respond to changes in secondary frequency have been used with some success. Vibration relays inherently lack a desired degree of accuracy for such purposes since they are operative over a wide range of frequencies. However, tuned capacitive-inductive circuits have been employed with greater success and they provide suitable control means. As for apparatus that is dependent upon current within a motor secondary it has usually required special relays entailing either multiple windings or other undesirable complex elements to provide initial contact movement upon a decrease of magnetizing current.

To avoid the necessity of employing the complex relays heretofore used in current responsive control systems and to avoid the use of frequency responsive circuits it is an object of this invention to provide a circuit which will vary the external resistance of a wound secondary induction motor in response to voltage prevailing in the motor secondary. Such a system has a plurality of relays sensitive to the voltage of the motor secondary, each being set to drop out at a predetermined voltage value. The relays may then selectively control the amount of external resistance to be applied to the motor circuit.

It is a further object of this invention to provide a simple means for adjusting a speed control system employing voltage responsive relays to permit choice of optimum values at which resistance may be added to and removed from the motor secondary circuit.

It is a further object of this invention to provide a system of control whereby an apparatus embodying the invention may be easily adjusted to operate with a wide variety of motor voltage and load ratings.

It is still another object of this invention to provide an induction motor control system wherein a relay responsive to the secondary voltage will operate to insert a plugging resistance in the motor secondary upon sudden reversal of the motor primary power connections and to remove this resistance upon a subsiding of the exceptionally high secondary voltage which prevails during plugging.

These and other objects and advantages of this invention will appear in the description that follows. In the description reference is made to the accompanying drawings which form a part hereof and in which there is shown, by way of illustration and not of limitation, one form of this invention.

Figure 2:
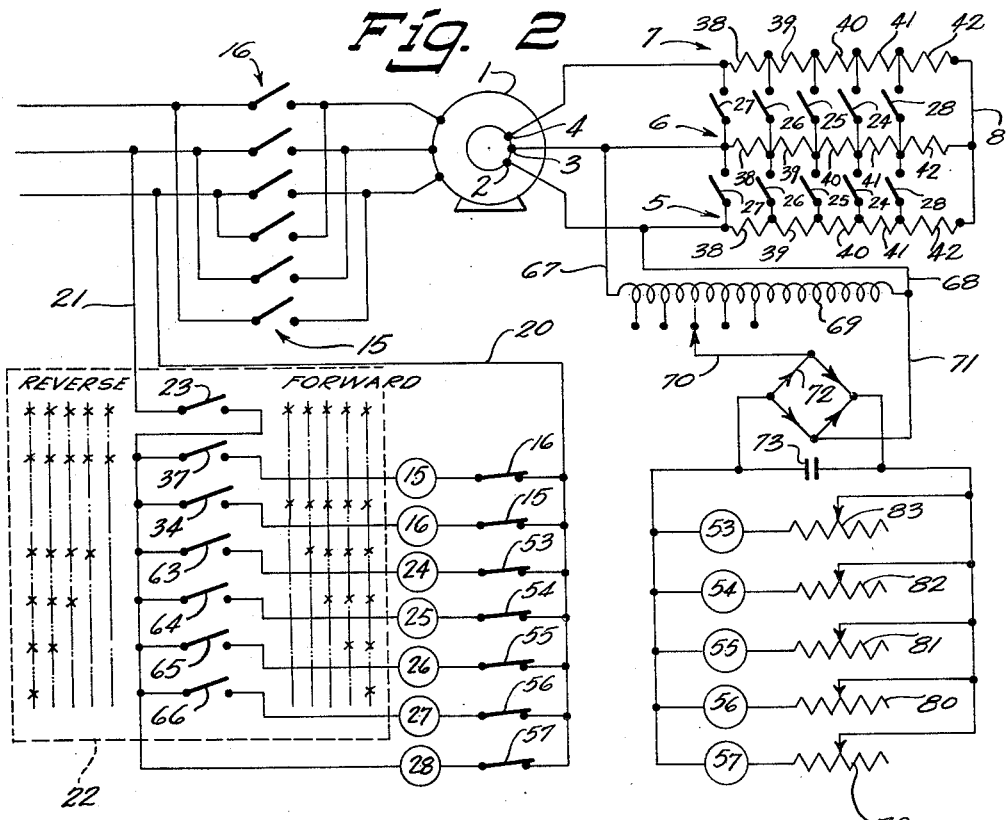
Figure 3:
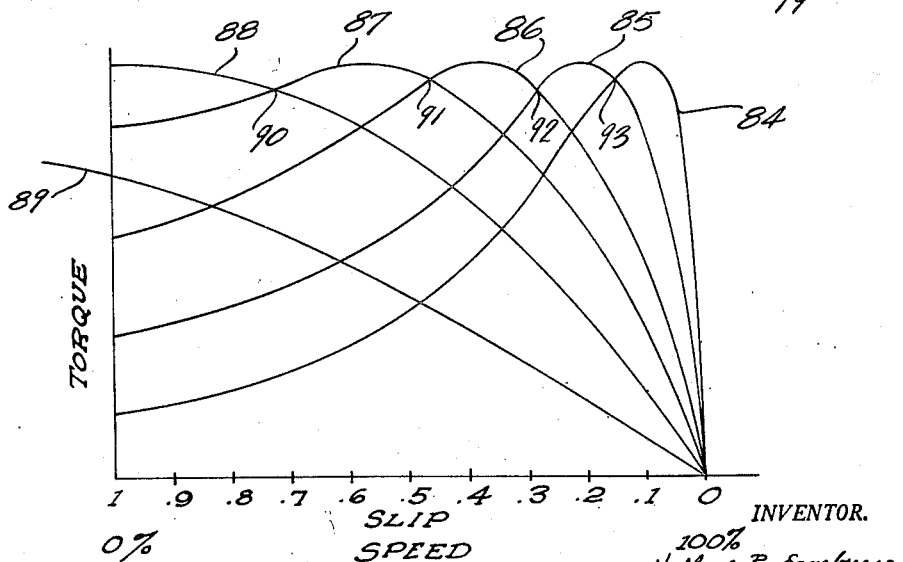

In the drawings:

Fig. 1 is a schematic wiring diagram of one form of a control circuit for a wound rotor induction motor which incorporates this invention, Fig. 2 is a simplified form of the diagram set forth in Fig. 1, to assist in more rapid analysis of said circuit, and Fig. 3 is a graph of the torque-speed characteristics of the motor of Fig. 1 for variations in motor secondary resistance.

Referring now to the drawings, there is shown in Fig. 1 a three phase induction motor 1 having a wound rotor secondary. Each of the secondary terminals 2, 3 and 4 of the motor 1 is connected to a resistor 5, 6 and 7 respectively. The resistors 5, 6 and 7 are joined to one another at their opposite ends by the lead 8. A set of power lines 9, 10 and 11 provides a power source for the motor 1. Leads 12, 13 and 14 connected at one end to the power lines 9, 10 and 11, join at their opposite ends through the alternative paths afforded by line contactor relays 15 and 16 with leads 17, 18 and 19 which are connected to the primary or stator of the motor 1. The two alternate paths afforded by the line contactor relays 15 and 16 provide a forward connection for the motor 1 upon closure of the line contactor relay 16 and a reverse connection for the motor 1 upon closure of the line contactor relay 15.

Control current leads 20 and 21 are energized by one phase of the power supply through connection to leads 12 and 13 as shown. The control current is fed by said leads 20 and 21 to a manual controller 22 which is schematically represented in neutral position and to a plurality of relays to be hereinafter described. The lead 21 runs direct to one side of the manual controller contact 23 and the opposite side of the contact 23 is connected to one side of each of the other controller contacts. The lead 20 connects to one terminal of each of the coils 43, 44, 45, 46 and 47 of control contactors 24, 25, 26, 27 and 28.

Control circuit connections for the line contactor relays 15 and 16 consist in part of a circuit for forward operation that starts at lead 20 and runs through lead 29, interlock contact 30 of line contactor relay 15, lead 31, coil 32 of line contactor relay 16, and lead 33 which connects to contact 34 of the manual controller 22. The remaining control circuit connections for the relays 15 and 16 consist of a circuit for reverse operation that is similar to that for forward operation and it includes interlock contact 35, coil 36 of line contactor relay 15, and contact 37 of the manual controller 22.

The control contactors 24, 25, 26, 27 and 28 are normally open and on closure act to determine the value of resistance in the secondary circuit of the motor 1. The resistors 5, 6, and 7 are each composed of five segments 38, 39, 40, 41 and 42 and these segments are connected to the contactors 24, 25, 26, 27 and 28 such that a closure of one of the contactors will short circuit the corresponding segments of resistors 5, 6 and 7 from active participation in the secondary circuit. Thus closure of the contactor 28 will remove all of the resistor segments 42 from the secondary circuit of the motor 1, closure of the contactor 24 will remove resistor segments 41 from the circuit, closure of the contactor 25 will remove the resistor segments 40 from the circuit, closure of the contactor 26 will remove resistor segments 39 from the circuit, and closure of contactor 27 will remove the remaining resistor segments 38 from the circuit.

As hereinbefore noted, one terminal of each of the coils 43, 44, 45, 46 and 47 of the contactors 24, 25, 26, 27 and 28 is connected to the control voltage lead 20. The circuits for the coils 43, 44, 45 and 46 are completed by respective leads 48, 49, 50 and 51 joined therewith and with the contacts of respective voltage response relays 53, 54, 55 and 56, and the respective leads 58, 59, 60 and 61 which connect to the respective contacts 63, 64, 65 and 66 of the manual controller 22. The circuit for the coil 47 is similarly completed by a lead 52 joined therewith, the contacts of voltage response relay 57 and a lead 62 connected to the manual controller 22. However, the lead 62 unlike the leads 58, 59, 60 and 61, connects to the side of the controller contacts that are common to one another.

Connected to one phase of the secondary of the motor 1 are leads 67 and 68 which are joined at their other ends to the input of an auto-transformer 69. Since the various horsepower and voltage ratings of induction motors are numerous the auto-transformer 69 is provided with adjustable taps to permit the control unit supplied thereby to be standardized and utilized with a wide range of motors. The output of transformer 69 is connected by leads 70 and 71 to a full wave rectifier 72 and to improve rectification filter condenser 73 is placed across the output terminals of the rectifier 72. The output of rectifier 72 is joined to five separate circuits, one for each of the coils 74, 75, 76, 77 and 78 of the set of voltage responsive relays 53, 54, 55, 56 and 57, each of which circuits contains one of the respective variable resistors 79, 80, 81, 82 and 83.

Fig. 2 depicts the same circuit as described in reference to Fig. 1. It is in line diagram style so as to afford ease in the analysis of the circuit operation. Both the contacts and coil of a relay are designated by the reference numeral employed in Fig. 1 to denote the complete relay as a further aid for circuit analysis.

Upon placing the manual controller 22 in any of the forward positions controller contacts 23 and 34 are closed to supply control current from leads 20 and 21 to the coil 32 of line contactor relay 16. Contactor relay 16 closes and the motor 1 is placed across the power lines 9, 10 and 11 for forward rotation. At the same time interlock contact 35 will open to preclude any possible closure of the line contactor relay 15 that is used for reverse rotation of the motor 1. At the initial moment of starting, slip is of 100% value and rotor induced voltage will be correspondingly large.

This voltage is impressed by means of leads 67 and 68 across the auto-transformer 69. Upon occurrence of a sufficient induced voltage in the secondary of motor 1 coils 74, 75, 76 and 77 will pick up and open their respective contacts. The variable resistors 80, 81, 82 and 83 are adjusted so as to insure such picking up and operating of the respective relays 53, 54, 55 and 56 upon occurrence of starting conditions. This opening of the contacts of the voltage response relays 53, 54, 55 and 56 precludes operation of the contactors 24, 25, 26 and 27. Voltage response relay 57, unlike the others, is set by means of adjustment of the resistor 79 to remain in a relaxed or normally closed position upon starting of the motor 1. The circuit for contactor 28 is therefore completed through the lead 21, the contact 23, the lead 62, the voltage response relay 57, the lead 52, and the lead 20. Closure of the contacts of contactor 28 then short circuits the segments 42 of resistors 5, 6 and 7 excluding them from the secondary circuit of the motor 1. The segments 42 thus will only be utilized as part of the secondary circuit of motor 1 upon plugging of the motor 1 as subsequently described.

Upon initial placement of the manual controller 22 in any of the reverse positions contacts 23 and 37 are closed to supply control current to the coil 36 of line contactor relay 15. This places the motor 1 across the power lines 9, 10 and 11 for reverse rotation and the interlock contact 30 is opened to preclude the operation of line contactor relay 16. The subsequent initial operation of voltage response relays 53, 54, 55, 56 and 57 is similar to that for forward operation.

With the manual controller 22 in stand-still or neutral position, as shown, a quick shift to the highest or fifth forward speed will effect closure of contacts 63, 64, 65 and 66 associated with the voltage response relays 53, 54, 55, 56, and 57. The motor 1 will accelerate to a maximum speed dependent upon load and resistance value in the secondary circuit. At the start all the resistance 5, 6 and 7 will be in the circuit except for the plugging segments 42. As the speed increase occurs torque ultimately diminishes. In order that optimum acceleration be obtained it is necessary that torque be maintained. Such is accomplished by reducing secondary resistance as soon as speed has reached a point where a reduction of external resistance if availed of will produce a sustaining of torque rather than a reduction of the same. In Fig. 3 there are shown the familiar speed torque curves of a typical wound rotor motor with the several segments of the resistors 5, 6 and 7 connected to the secondary thereof. The numerals 88 to 84 which designate the several curves correspond to successive closures of the contactors 24 to 27. The curve 89 corresponds to the plugging condition in which all the grid control contactors including relay 28 are in open position.

For optimum acceleration the voltage response relay 53 is adjusted by means of the resistor 83 to drop out when voltage falls to that value which corresponds with a motor speed at or in the vicinity of the point 90 in Fig. 3. The contactor 24 then closes and removes the resistor segments 41 from the secondary circuit. Torque which had been decreasing along the curve 88 then is sustained by following after closure of contactor 24 the curve 87 until the point 91 is reached. The vicinity of the point 91 is another optimum speed at which to reduce external resistance. The voltage response relay 54 is thus adjusted to drop out at this point and the resulting closure of contactor 25 removes the segments 40 from the secondary and the torque rises along curve 86 instead of following the decreasing slope of the curve 87. In a like manner the voltage response relay 55 drops out when point 92 is reached to reduce external resistance so as to sustain the torque along the curve 85. When the point 93 is reached the voltage response relay 56 drops out and permits closure of the contactor 27 which removes the remaining resistance from the secondary. The motor 1 now operates on the curve 84 to a point where slip is sufficient to provide torque adequate to overcome load and rotational losses.

A delay of acceleration or a speed control may be had by placing the manual controller 22 in less than fifth or highest speed. The first position maintains the contacts 63 through 66 open and as hereinbefore noted all of the resistors 5, 6 and 7 are in the secondary circuit except the plugging segments 42. The torque of the motor 1 will follow the curve 88 and the possible maximum speed will be less than that obtainable if the torque were to follow any of the curves 87 through 84.

Placing the controller 22 in the second forward position closes the contact 63. The closure of contact 63 and the dropping out of the voltage response relay 53 upon reaching the vicinity of the point 90 will complete the circuit of the coil 43 of contactor 24. The contactor 24 then closes and removes the segments 41 from the secondary. Now the torque may follow curve 87 to maintain acceleration and the possible maximum speed will be greater than that of the first position of the controller 22.

In similar manner successive placement of the controller 22 in its speed positions 3, 4 and 5 will close respective contacts 64, 65 and 66 which permit in turn the utilization of the respective curves 86, 85 and 84 upon the drop out of respective voltage response relays 54, 55 and 56.

With the motor operating in either forward or reverse direction, plugging is accomplished by moving the controller 22 through neutral position to that of the opposite sense from which the motor is running. The momentary passing through the neutral position opens line contactor relays 15 and 16 and the circuits for contactors 24 through 28. All of the segments of the resistors 5, 6 and 7 will then be in the secondary circuit. As the controller 22 then moves into the zone of opposite rotation the respective line contactor relay 15 or 16 will close and the secondary circuit will have induced therein a frequency greater than line frequency and a voltage greater than locked rotor voltage. Voltage response relays 53 through 56 will energize and open similarly as when initial starting takes place, for the output of rectifier 72 is now at a greater value than that corresponding to a locked rotor. Voltage response relay 57 will also respond when the secondary voltage exceeds that encountered upon starting and the opening of its contacts maintains resistor segments 42 in the secondary circuit. Current inrush is thereby limited and increased torque to urge reversal is made available.

As the secondary voltage drops in value and approaches locked rotor voltage, relay 57 will drop out or relax to its normally closed position. The coil 47 of the contactor 28 will now be energized and the plugging resistor segments 42 will be removed from the secondary circuit. As the motor 1 momentarily stops and then accelerates in the direction dictated by the position of the manual controller 22 the operation of the contactors and relays will be as hereinbefore described.

Operating conditions under which insertion and removal of the plugging resistor segments 42 occur may be controlled by adjustment of the variable resistor 79. An increase of resistance value in series with the coil 78 of the voltage response relay 57 will raise the secondary voltage values at which resistor segments 42 are inserted and removed from the secondary circuit.

The voltage response control relays 53, 54, 55, 56 and 57 require neither special construction nor design. Direct current relays that reliably pick up and drop out at predetermined voltage values are available and may be cheaply and easily constructed. The apparatus of this invention may employ such relays and by adjustment of the resistors 79 through 83 speed settings may be had that are accurate to within very narrow limits.

I claim:

1. In an induction motor control system for a wound secondary polyphase induction motor having an external resistance composed of a plurality of resistor segments connected in circuit with the secondary windings thereof the combination comprising a plurality of magnetic contactors corresponding with said resistor segments having coils and contacts, said contacts being connected respectively with the segments of said external resistance to successively shunt the same to successively reduce the resistance in circuit with said wound secondary upon successive closure of said contacts, a rectifier circuit having input leads and output leads, circuit connections joining the input leads of said rectifier circuit in shunt relation with a secondary winding of said motor, filter means in said rectifier circuit to render the output thereof substantially free of pulsation, a plurality of voltage responsive relays corresponding with said magnetic contactors each having relay contacts and a voltage responsive coil said coil being connected to the output leads of said rectifier circuit, each of said voltage responsive relays having a voltage response differing from the others, and a control circuit for each of said magnetic contactors comprising a source of control current and connections joining the coils of the respective magnetic contactors through the relay contacts of the respective voltage responsive relays thereof with said control current source whereby said voltage responsive coils successively close their relay contacts as the slip of said motor decreases to permit said magnetic contactors to successively shunt said resistance segments to reduce resistance in circuit with said wound secondary.

2. In an induction motor control system for a wound secondary polyphase induction motor having an external resistance composed of a plurality of resistor segments connected in circuit with the secondary windings thereof the combination comprising a plurality of magnetic contactors corresponding with said resistor segments having coils and contacts, said contacts being connected respectively with the segments of said external resistance to successively shunt the same to successively reduce the resistance in circuit with said wound secondary upon successive closure of said contacts, a rectifier circuit having input leads and output leads, circuit connections joining the input leads of said rectifier circuit in shunt relation with a secondary winding of said motor, filter means in said rectifier circuit to render the output thereof substantially free of pulsation, a plurality of voltage responsive relays corresponding with said magnetic contactors each having relay contacts and a voltage responsive coil, said coil being connected to the output leads of said rectifier circuit, each of said voltage responsive relays having a voltage response differing from the others, a plurality of manually controlled contacts corresponding with said magnetic contactors, and a control circuit for each of said magnetic contactors comprising a source of control current and connections joining the coils of the respective magnetic contactors through the relay contacts of the respective voltage response relays thereof and the respective manually controlled contacts thereof with said control current source.

3. In an induction motor control system for an induction motor having an external resistance composed of a plurality of resistor segments in circuit with the secondary windings thereof the combination comprising a magnetic contactor having a coil and contacts connected to said resistance segments to reduce the number of the same in circuit with the secondary of said motor upon closure of said magnetic contactor, a rectifier circuit having input leads and output leads, circuit connections joining the input leads of said rectifier circuit in shunt relation with a secondary winding of said motor, a capacitive filter in said rectifier circuit in shunt connection with the output leads thereof to render the output thereof substantially free of pulsations, a voltage responsive relay having contacts and a coil connected to the output leads of said rectifier circuit, said voltage responsive relay having a voltage response to initially open the contacts associated therewith upon occurrence of a voltage substantially greater than locked rotor voltage occurring in the secondary of said motor, and a circuit for connection of the coil of said magnetic contactor to a voltage source including the contacts of said voltage responsive relay in series relationship with the coil of said magnetic contactor.

4. In an induction motor control system for an induction motor having an external resistance composed of a plurality of resistor segments in circuit with the secondary of said motor the combination comprising a plurality of magnetic contactors corresponding with said resistor segments having coils and contacts, said contacts being connected respectively with said resistor segments to successively reduce the number of said resistor segments in circuit with the secondary of said motor upon successive closure of said contacts, a rectifier circuit having input leads and output leads, circuit connections joining the rectifier circuit in shunt relation with a secondary winding of said motor, a capacitive filter in said rectifier circuit in shunt connection with the output leads thereof to render the output thereof substantially free of pulsations, a plurality of voltage responsive relays corresponding with said magnetic contactors each having contacts and a coil, said coil being connected to the output leads of said rectifier circuit, each of said voltage responsive relays having a voltage response differing from the others and one of said voltage responsive relays having a voltage response to be initially activated only upon occurrence of a voltage substantially greater than locked rotor voltage occurring in the secondary of said motor, and a control circuit for each of said magnetic contactors comprising a source of control current and connections joining the coils of the respective magnetic contactors through the relay contacts of the respective voltage responsive relays thereof with said control current source.

5. In an induction motor control system for a wound secondary polyphase induction motor having an external resistance composed of a plurality of resistor segments connected in circuit with the secondary windings thereof the combination comprising a plurality of voltage responsive coil actuated switch means corresponding with said resistor segments each having a coil having a voltage response differing from the others, said switch means being connected respectively with the segments of said external resistance to successively shunt the same to successively reduce the resistance in circuit with said wound secondary upon successive closure of said switch means, a rectifier circuit having input leads and output leads and including capacitive means in shunt connection with the output leads thereof to minimize pulsations in the output of said rectifier circuit, circuit connections joining the input leads of said rectifier circuit in shunt relation with a secondary winding of said motor, and a voltage response circuit for each of said switch means coils connecting each of said coils to the output leads of said rectifier circuit.

References Cited in the file of this patent

UNITED STATES PATENTS

| Number | Name | Date |
|---|---|---|
| 1,012,477 | Sundh | Dec. 19, 1911 |
| 2,024,713 | Wickerham | Dec. 17, 1935 |
| 2,069,599 | Brown | Feb. 2, 1937 |
| 2,165,491 | Leitch | July 11, 1939 |
| 2,238,613 | Wickerham | Apr. 15, 1941 |

FOREIGN PATENTS

| Number | Country | Date |
|---|---|---|
| 533,865 | Great Britain | Feb. 21, 1941 |
| 679,619 | Germany | Aug. 10, 1939 |
| 833,946 | France | Aug. 1, 1938 |